United States Patent [19]

Pahlavan et al.

[11] Patent Number: 4,660,214
[45] Date of Patent: Apr. 21, 1987

[54] QANI TRELLIS-CODED SIGNAL STRUCTURE

[75] Inventors: Kaveh Pahlavan, Newton; Jerry L. Holsinger, West Boxford, both of Mass.

[73] Assignee: Infinet, Inc., Andover, Mass.

[21] Appl. No.: 761,606

[22] Filed: Aug. 1, 1985

[51] Int. Cl.[4] ............................................ H04L 27/02
[52] U.S. Cl. ...................................... 375/39; 371/43; 375/58
[58] Field of Search ..................... 375/39, 42, 53, 58, 375/34; 371/43, 44; 329/135; 332/17, 9 R, 10; 370/20; 179/2 DP

[56] References Cited

U.S. PATENT DOCUMENTS

| | | | |
|---|---|---|---|
| 3,887,768 | 6/1975 | Forney, Jr. et al. | 375/42 |
| 3,955,141 | 5/1976 | Lyon et al. | 375/39 |
| 3,988,539 | 10/1976 | Motley et al. | 375/39 |
| 4,271,527 | 6/1981 | Armstrong | 375/39 |
| 4,347,616 | 8/1982 | Murakami | 375/20 |
| 4,439,863 | 3/1984 | Bellamy | 375/18 |
| 4,464,767 | 8/1984 | Bremer | 375/67 |
| 4,493,082 | 1/1985 | Cumberton et al. | 371/43 |

OTHER PUBLICATIONS

R. W. Lucky, "Digital Phasi and Amplitude Modulated Transmission Systems", Ph.D. Thesis, Purdue Univ., 1961.
Schwartz, Information Transmission Moduation and Noise, (3d ed., 1980), pp. 226–235.
Proakes, "Modulation and Demodulation for the Additive Gaussian Noise Channel", Digital Communications, 1983, pp. 182–190.
Gottfried Ungerboeck, "Channel Coding with Multilevel/Phase Signals," IEEE Transactions on Information Theory, vol. IT-28, No. 1, pp. 55–67, Jan. 1982.
"Draft Recommendation for 14,000 Bits Per Second Modem," USA, Temporary Document D177, Oct., 1983.
"Statistical Multiplexers from Paradyne" (Advertisement, at least as early as Mar. 13, 1985).
Gerwen, et al, "Microprocessor Implementation of High-Speed Data Modems38 , IEEE Transactions on Communications, vol. COM–25, No. 2, Feb., pp. 238–249.
Koya, et al, "High Speed Data Modem Using Digital Signal Processor", International Communications Conference, 1981, pp. 14.7.1–14.7.5.
A. Digeon, "On Improving Bit Error Probability of QPSK and 4–Level Amplitude Modulation Systems by Convolutional Coding", IEEE Transactions on Communications, vol. COM–25, No. 10, Oct., 1977, pp. 1238-9–1239.
Lucky, et al, "In the Optimum Performance Of N-ary Systems Having Two Degrees of Freedom", IRE Transactions on Communications Systems, Jun., 1962, pp. 185–192.
Kernighan, et al, "Heuristic Solution of a Signal Design Optimization Problem", The Bell System Technical Journal, Sep., 1973, vol. 52, No. 7, pp. 1144–1159.
Foschini, et al, "On the Selection of a Two-Dimensional Signal Constellation in the Presence of Phase Jitter and Gaussian Noise", The Bell System Technical Journal, vol. 52, No. 6, Jul.–Aug., 1973, pp. 927–965.
Foschini, et al, "Optimization of Two-Dimensional Signal Constellations in the Presence of Gaussian Noise", IEEE Transactions on Communications, vol. COM-22, No. 1, Jan., 1974, pp. 28–38.

Primary Examiner—Benedict V. Safourek
Attorney, Agent, or Firm—Lahive & Cockfield

[57] ABSTRACT

A signal structure for high speed Trellis coded data communications selects each signal point in the structure to attain a low probability of error in the presence of both additive noise and multiplicative noise. Viterbi decoding is modified to take account of the multiplicative noise energy content of the received signal.

6 Claims, 10 Drawing Figures

Binary numbers refer to: $Q6_n, Q5_n, Q4_n, Q3_n, Q2_n, Q1_n, Q0_n,$
A, B, C, D refer to synchronizing signal elements

QANI TRELLIS-CODED SIGNAL STRUCTURE

BACKGROUND OF THE INVENTION

This invention relates to the high speed transmission of digital data in analog form with a low rate of error due to transmission impairments such as electrical noise. More particularly the invention provides new signal structures and decoding procedures for coded data communications characterized by relatively high immunity to error due to multiplicative noise, as well as additive noise and phase jitter.

Another signal structure resistant to error by multiplicative noise is described in co-pending application for patent Ser. No. 554,261 entitled "Signal Structure for Data Communication".

Digital data conventionally is transmitted, as on telephone lines, by sending a carrier signal with analog modulation selected to convey, in every time interval, a set of binary digits. A conventional practice sends M bits once per transmission interval, i.e., the baud interval, where M is an integer. The M bits have $2^M$ possible values. Hence a coded analog signal in this practice has a structure which identifies one of the $2^M$ possible values once per baud interval. For example, to send 2,400 bits per second (bps) over a line using a 2400 baud rate, in each baud interval a single bit is transmitted by selecting the analog signal to send one of two values, i.e., $M=1$ and $2^M=2$. Examples of conventional higher speed transmission rates are 9,600 bps wherein four bits are transmitted in each interval by sending one of sixteen analog values; and 14,400 bps, wherein six bits are transmitted in each interval by sending one of sixty-four analog values. Conventional baud rates include 1200; 1600; and 2400 symbols per second.

One conventional analog signal used for data transmission employs double sideband-quadrature carrier modulation (DSB-QC). This modulation technique involves two carrier signals 90° apart in phase, that is having a quadrature relation, and each having double sideband modulation.

The coding of the modulation, in particular the selective amplitude and phase of the modulation, is defined by two analog parameters designated $a_i$ and $b_i$ where (i) is an integer. The values of these modulation parameters identify, in each baud interval, the one analog value being transmitted. Thus, in a 9,600 bps transmission system, there are sixteen possible sets of the two analog parameters to identify one of the sixteen possible analog values being sent. Similarly in a 14,400 bps transmission system, there are sixty-four possible sets of the two analog parameters.

The values of the modulation parameters are conventionally plotted or mapped as points in a two-coordinate complex plane. The set of points for a transmission system is termed a "signal structure", or "signal space," or "signal constellation".

The occurrence of electrical noise and other transmission impairments makes it difficult, however, to determine the value of the modulation parameters at the receiver end of a data transmission system. The probability of error due to this difficulty in value determination increases with the speed of data transmission. This is because higher transmission speeds involve a greater number of possible values in each baud interval, and it thus becomes increasingly difficult to distinguish between them in the presence of electrical impairments.

It is known to select a signal structure to reduce error rates and otherwise to enhance data transmission. U.S. Pat. Nos. 3,887,768 and 4,271,527 disclose two designs for signal structures. These and other known signal structures are nevertheless subject to significant error rates in the presence of certain forms of transmission impairments.

In order to further reduce transmission error, and at the same time increase and enhance transmission speed, various digital signal encoding methods have been employed. Among them are the Trellis codes which are one form of the class of convolutional codes. In accordance with these digital encoding methods, a block of input bits, for example six bits, are encoded into, for example, seven bits. Thus instead of a signal constellation having sixty-four points corresponding to six bits, the signal constellation has one hundred and twenty-eight points corresponding to seven bits. While at first glance it would appear that a signal constellation having more points would require more energy or a slower transmission rate, by proper use and selection of the encoding and decoding methods, an increased bit rate at constant energy and probability of error can be achieved. Thus, the CCITT has endorsed and recommended a particular Trellis coding method which provides superior performance in the presence of additive noise. That method has been commercialized in equipment operating at 14.4 kb/s and 16.8 kb/s.

The advantage of such encoding mechanisms lies in the interrelationship of successively received signals. Thus, when operating with a Trellis code, for example, one examines not only a just received point ($A_i$, $B_i$), but the relationship of that received point with, for example, seventeen previously received points. The effect is to provide an improved error rate even though the number of points in the signal constellation increases and the average energy of the signal remains constant.

An object of this invention is accordingly a data transmission method and apparatus for communicating data at higher data rates with an improved low error rate in the presence of different forms of transmission impairments.

Another object of the invention is a signal structure for high speed coded data transmission with relatively high immunity to error in the presence of different forms of transmission impairments.

A further object of the invention is a signal decoding method for providing an improved low error rate for Trellis and other convolutional encoders.

Other objects of the invention are a data transmission method and apparatus which are reliable at high data rates over telephone communications channels, which can be readily competitive with commercially available equipment, which require minimal additional hardware for its implementation, and which does not impair the functional basis for the encoding method with which it is employed.

Other objects of the invention will in part be obvious and will in part appear hereinafter.

GENERAL DESCRIPTION OF INVENTION

According to this invention, high speed data transmission using Trellis coding employs a signal structure resistant to impairment by multiplicative noise, as well as by additive noise. The signal structure also has substantial immunity to phase jitter. Each signal point in the new signal structure has essentially the same low probability of transmission error due to multiplicative noise and to additive noise. In addition, the signal points have an overall minimal electrical power requirement and accordingly are located at minimal distances from the origin in a signal constellation planar representation.

Different forms of transmission impairments have different dependencies on the power of the signal being transmitted and hence on the signal points, that is, modulation parameter values, of each transmitted pulse. Additive noise, also termed "white noise", is theoretically independent of the power associated with a signal point. It therefore has substantially the same value for the transmission of any point in a signal constellation. Multiplicative noise, on the other hand, is a function of signal power. For a DSB-QC modem, the power of multiplicative noise for any signal point is directly related to the square of the distance of that signal point from the origin of the signal space planar representation. This form of noise accordingly varies with the location of a signal point from the origin of the signal space. Phase jitter is another form of transmission impairment. It causes signal degradation which is related linearly to the distance of a signal point from the coordinate origin.

One feature of the invention is that the signal structure reduces errors due to multiplicative noise, attains relatively good performance relative to additive noise, and maintains the relative distance requirements of Trellis coding. That is, with this invention one can determine a signal structure that resists degradation by multiplicative noise and which also resists degradation by additive noise to nearly the extent as when the signal space is designed with regard only to additive noise. The invention thus provides a large gain in performance relative to multiplicative noise with only a relatively small loss from the optimum performance otherwise available exclusively for additive noise. Signal structures previously designed and used in connection with Trellis coding did not take into account multiplicative noise impairment. In accordance with the invention, however, a signal structure is accordingly determined with increased emphasis on impairment by multiplicative noise.

Another feature of the invention is that a signal structure determined with regard to both multiplicative noise and additive noise further has a relatively high resistance to degradation due to phase jitter. Thus, designing a signal structure according to the invention to enhance immunity to multiplicative noise impairment appears to enhance immunity to phase jitter impairment to a degree nearly as high as occurs when the design has greater emphasis exclusively on phase jitter impairments.

A signal structure according to the invention can be viewed, to a first approximation, as having two subsets of points. The points of one subset, located closer to the origin, and within a circle of radius r, are in a configuration determined primarily by consideration of additive noise and the Trellis coding and in a preferred embodiment are identical in relative structure to the signal space recommended by CCITT. The points of the second subset, i.e., those further from the origin than "r", are located primarily from a consideration of multiplicative noise impairment and the Trellis coding considerations. In typical practice of the invention, therefore, where substantial levels of both multiplicative noise and additive noise are present, the value of "r" is set so that the inner subset contains the signal points which have a power level below the average power for the entire signal constellation; while those points having a power level above the average power are in the outer subset.

The new signal structure differs from the recommended CCITT regular array primarily in the outer subset of points. In the new structure, points most proximal to either axis are spaced further from that axis than in the conventional recommended array. Further, points equidistant from both axes are spaced farther outward from the origin in the new signal structure. Other points in the outer subset also are at locations different from those of the recommended array; the relocation attaining a reduction in the density of the points, as contrasted to the conventional recommended configuration.

These and other features described hereafter regarding the new signal space attain data transmission, on voice-grade telephone lines, which has an improved overall signal-to-multiplicative noise ratio generally in excess of two decibels (dB), and hence has around two orders of magnitude reduction in error rate.

DESCRIPTION OF THE DRAWINGS

Other objects, features, and advantages of the invention will be apparent from the following detailed description taken together with the accompanying drawings, in which.

DESCRIPTION OF A PREFERRED EMBODIMENT

Figure 1:
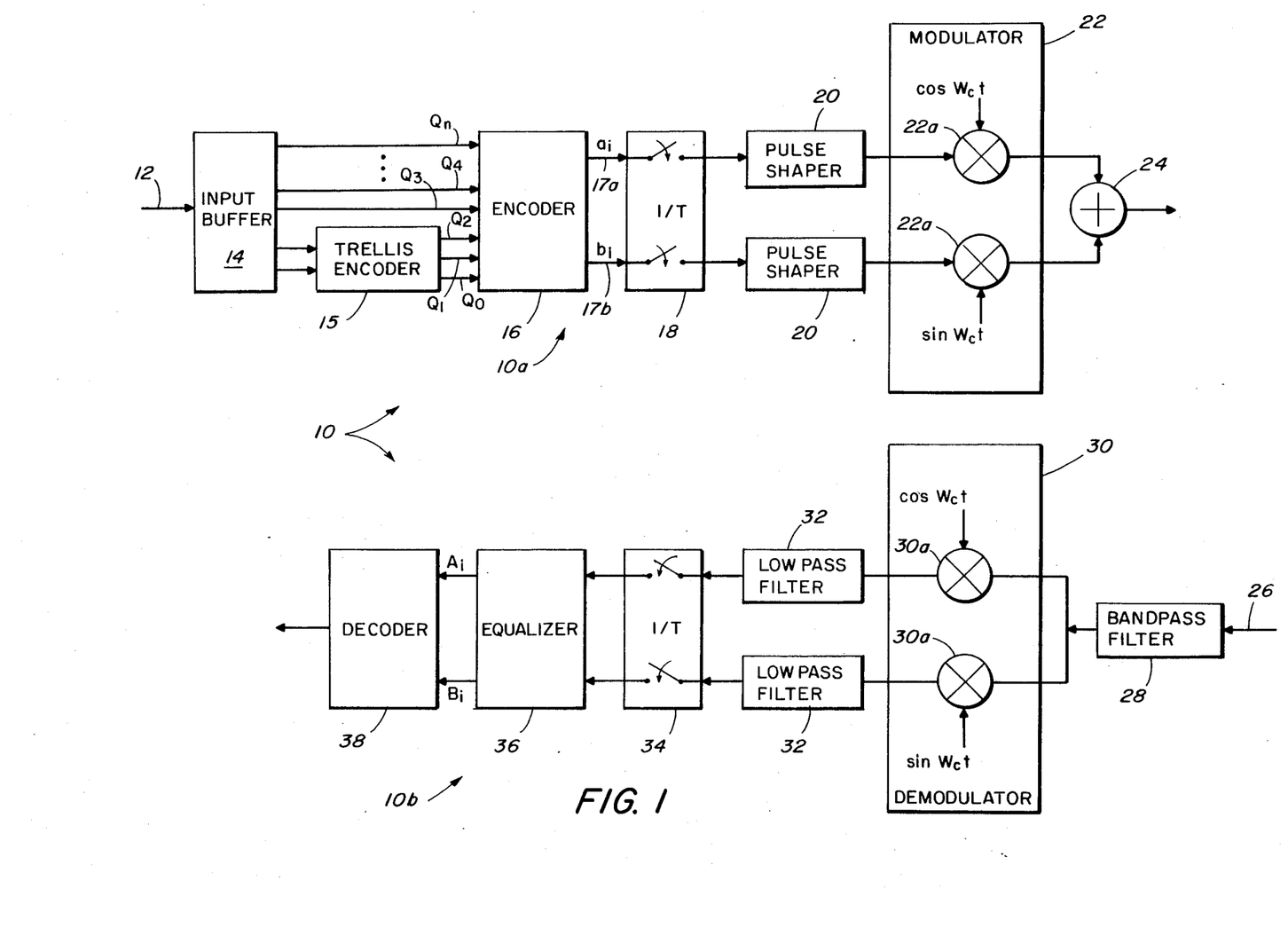
FIG. 1 is a block schematic representation of a modem for use in practice of the invention.

Referring to FIG. 1, a double sideband, quadrature carrier modulation modulator-demodulator, a DSB-QC modem, 10, with which the invention can be practiced for operation over voice-grade telephone lines, has, as is conventional, a transmit section 10a and a receive section 10b. The transmit section 10a of the illustrated modem 10 receives, over an input line 12, a stream of binary information to be transmitted, and stores the binary information in an input buffer 14. The input buffer is a serial-to-parallel converter and provides on its output lines a block of input bits, for example six, corresponding to a like-numbered group of serially received input bits. Two of the six output bits pass through a Trellis encoder 15, which adds redundancy according to a selected coding method in the form of an extra bit, and outputs three bits to a mapping encoder 16. The encoder 16 maps each binary input block to two analog signals that define a pair of modulation parameters, designated $a_i$ and $b_i$, for the time interval $t_i$. These parameters define the one point in the signal structure or constellation which identifies the input binary block. The encoder 16 can, for example, be implemented using a look-up table and provides analog signals representing $a_i$ and $b_i$ over lines 17a, and 17b respectively.

An electronic switch 18 samples the two signal parameters at the selected baud rate 1/T. A pair of signal shaping circuits 20, 20, each typically a pulse shaping low-pass filter network, shapes the analog pulses as required for transmission and applies them to a modulator 22 illustrated as having a pair of oscillators 22a, 22a, to modulate two carrier waveforms. The carrier waveforms, designated (cos wt) and (sin wt), differ in phase by 90°. A summing device 24 combines the two amplitude modulated carrier signals to produce a quadrature amplitude modulated (QAM) output signal, preferably employing double side band modulation of each carrier, ready for transmission to another like terminal.

With further reference to FIG. 1, the receiver section 10b of the illustrated modem receives on line 26 the quadrature amplitude modulated (QAM) signal and applies it to a bandpass filter 28 that suppresses unwanted frequency components. A demodulator 30, illustrated as having two demodulation stages 30a, 30a that receive the (cos wt) and (sin wt) component waveforms respectively, and shift the bandpass-filtered signal to two components at a specified baseband. Each signal component is shaped further with a low pass filter 32, and is applied to a sampling switch 34. An equalizer 36 receives the sampled signal components and prepares them for decoding in a decoder 38. The decoder produces the multiple-digit binary symbol with which the modulation parameters of the received QAM signal are identified. In accordance with the preferred embodiment of the invention, the decoder operates in accordance with the well known Viterbi algorithm which has been modified as described in more detail hereinafter to provide an improved performance.

Figure 2:
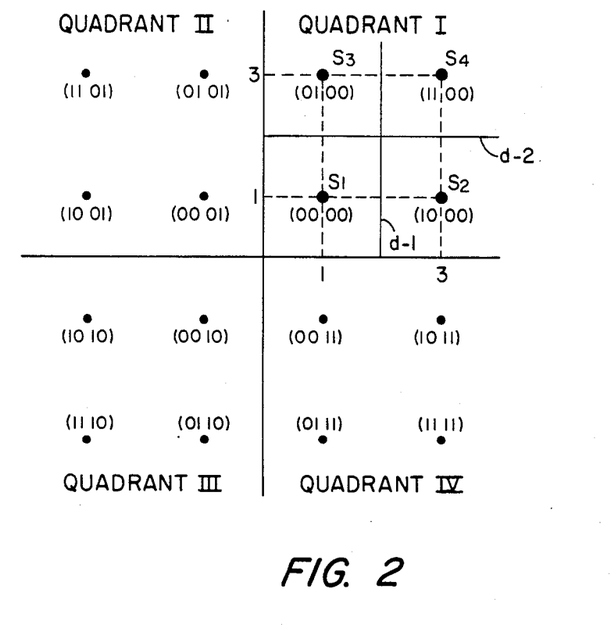
FIG. 2 illustrates a prior art, uncoded, sixteen point signal constellation.

Referring to FIG. 2, a conventional prior art signal constellation having sixteen points arranged in a regular rectangular array with four points in each of four identical quadrants of a complex plane can be employed for uncoded modulation at 9.6 kb/s. The quadrants are designated with Roman numerals, and the points in each quadrant are designated by a four-bit number identifying the binary block which the point represents. The coordinates of the points are also designated, in this instance, with numerals along each coordinate axis. The decision lines for distinguishing each signal point in quadrant I from another point are the coordinate axes and the solid lines d-1 and d-2. Each point in this rectangular pattern is located at the center of a square decision region bounded by decision lines.

The modem 10 of FIG. 1, when operating with this signal pattern, does not require Trellis encoder 15 for reliable communications, and encoder 16 produces modulation parameters by mapping each four-bit digital input symbol to one of the sixteen points of FIG. 2 as denoted by the four-bit numbers associated with each point. Conversely, the receiver decoder, for this uncoded case, converts the pair of received modulation parameters, $A_i$, $B_i$, determined from the received signal, to the corresponding four-digit symbol according to the decision region in which the received modulation parameters fall.

Figure 3:
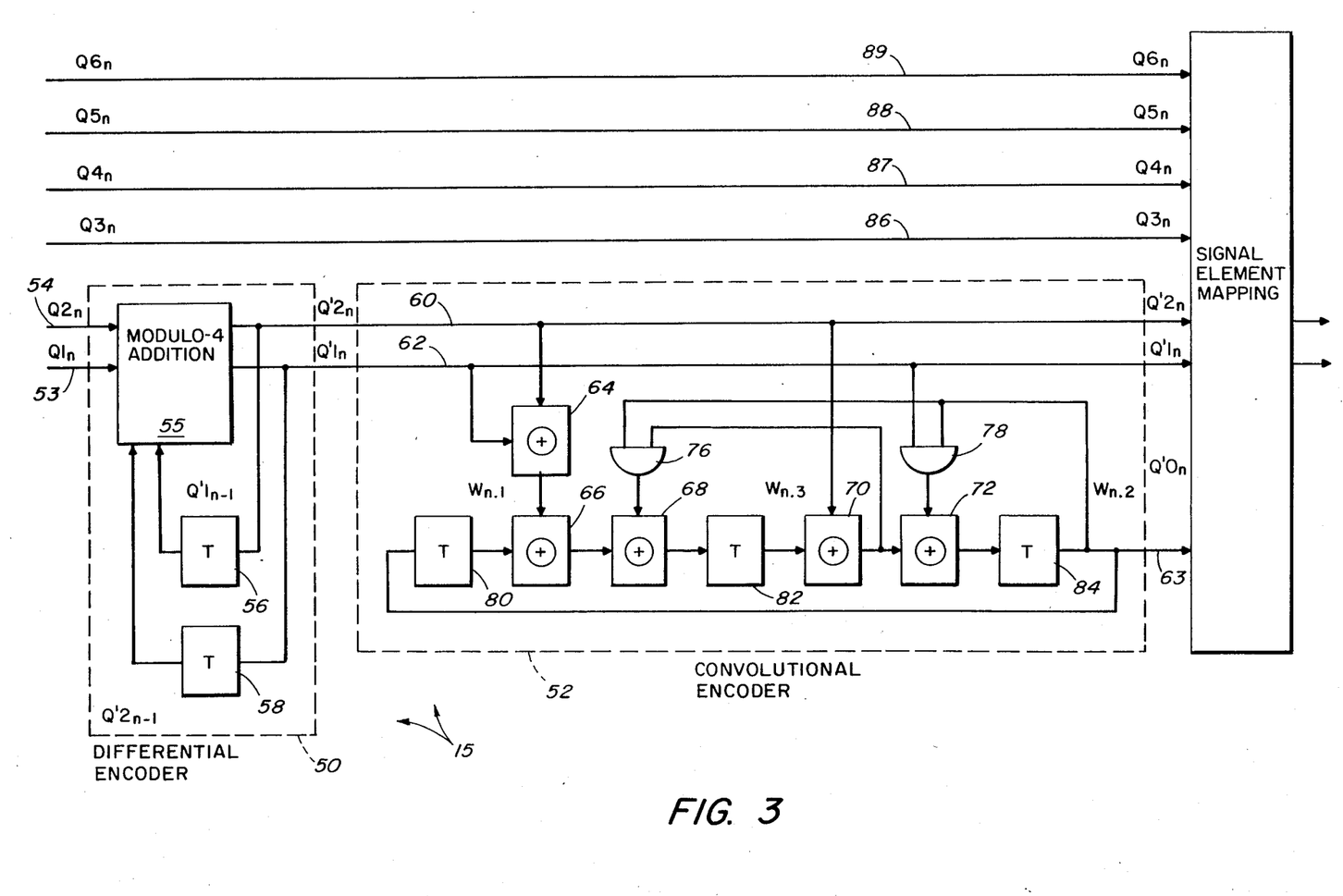
FIG. 3 is an electrical schematic showing a CCITT recommended Trellis encoder hardware structure.

A signal space or signal constellation such as that illustrated in FIG. 2 cannot be employed satisfactorily as the data rate reaches 14.4 or more kb/s over a voice-grade telephone communications channel. As a result, several commerical products employ Trellis coding to improve the effective signal-to-noise ratio of the communications system thereby allowing higher bit rates to be employed. Referring then to FIG. 3, for a modem employing Trellis coding, the Trellis encoder 15 used for Trellis coding has a differential encoder 50 and a convolutional encoder 52 which together operate to form the three Trellis encoded, and redundant, input bits, $Q_0$, $Q_1$, $Q_2$ which mapping encoder 16 receives. Encoder 16 also receives bits $Q_3$, $Q_4$, $Q_5$, $Q_6$ directly from buffer 14.

The differential encoder 50 receives the two low order input bits from buffer 14 over lines 53 and 54. The differential encoder 50 employs a modulo-four addition circuitry 55 to add newly input data to the previous output of the adder. The adder outputs are fed back to the adder input through time delays 56, 58. The delay time corresponds to one symbol or baud time. The outputs of the differential encoder 50, a two-bit output over lines 60, 62, are passed directly to the signal space mapping encoder 16 as well as to the convolutional encoder 52. The convolutional encoder generates a third, redundancy bit over a line 63. The particular convolutional encoder of FIG. 3 is recommended by CCITT for use with Trellis coding at 14.4 kb/s. The encoder employs a plurality of EXCLUSIVE OR gates 64, 66, 68, 70, and 72, AND gates 76 and 78, and one baud time delays 80, 82, and 84 to generate the redundant bit over line 63. It is important to recognize that the upper four bits, $Q_3$, $Q_4$, $Q_5$, and $Q_6$, over lines 86, 87, 88, 89, respectively, are not modified. There results a seven-bit input to the signal mapping encoder 16. The signal mapping encoder 16 provides an output in accordance with the mapping provided by the CCITT recommended signal constellation illustrated in FIG. 4.

Figure 4:
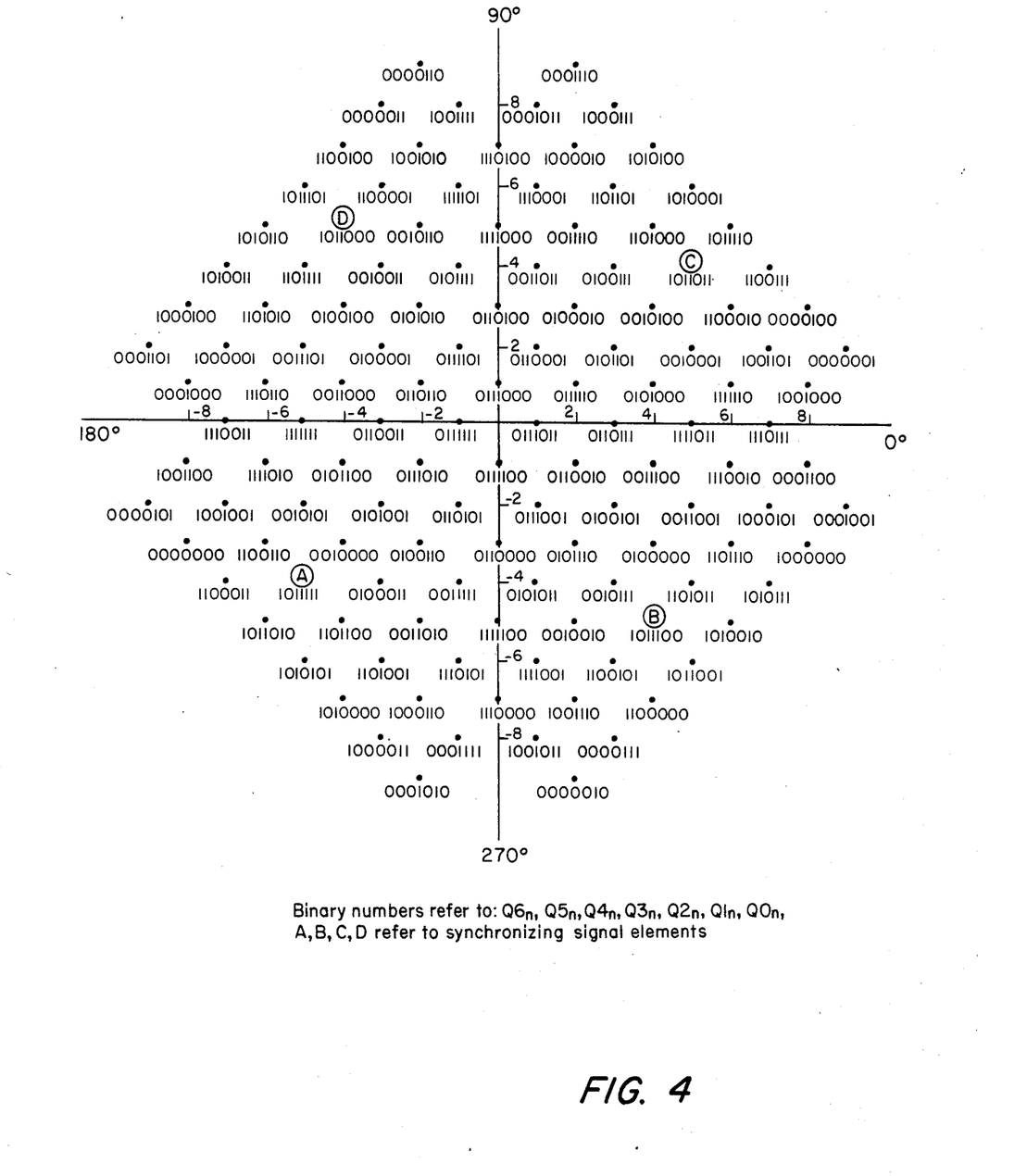
FIG. 4 shows a CCITT recommended, Trellis coding signal structure for 14,400 bps modems.

Referring to FIG. 4, each point in the signal constellation has associated with it a seven binary digit number. The bits are labeled $Q_0$, $Q_1$, $Q_2$, ..., $Q_6$, corresponding to FIG. 3. Of those seven binary digits, the rightmost three bits $Q_2$, $Q_1$, $Q_0$, the encoded bits, can be employed for designating eight sets or classes of points, each set having sixteen points therein.

If we define

[i]: as the set of points in the signal constellation with a subscript i (designated by bits $Q_2$, $Q_1$, $Q_0$) where i equals, for the illustrated embodiment of FIG. 4, 0, 1, 2, ..., 7; and dis[j]: as the minimum distance between all points of the set j;

then, Trellis coding imposes, for the signal constellation of FIG. 4, the following limitations:

$$\text{dis}[0 U 1 U 2 U 3 U 4 U 5 U 6 U 7] = \sqrt{2}, \quad \text{(Equation 1)}$$

(where U designates the "union" operation);

$$\text{dis}[0 U 2 U 4 U 6] = \text{dis}[1 U 3 U 5 U 7] = 2; \quad \text{(Equation 2)}$$

$$\text{dis}[0 U 2] = \text{dis}[4 U 6] = \text{dis}[1 U 3] = \quad \text{(Equation 3)}$$

-continued $$dis[5U7] = 2\sqrt{2};$$

and $$dis[0] = dis[1] = dis[2] = dis[3] = dis[4] = dis[5] = dis[6] = dis[7] = 4 \quad \text{(Equation 4)}$$

Figure 5:
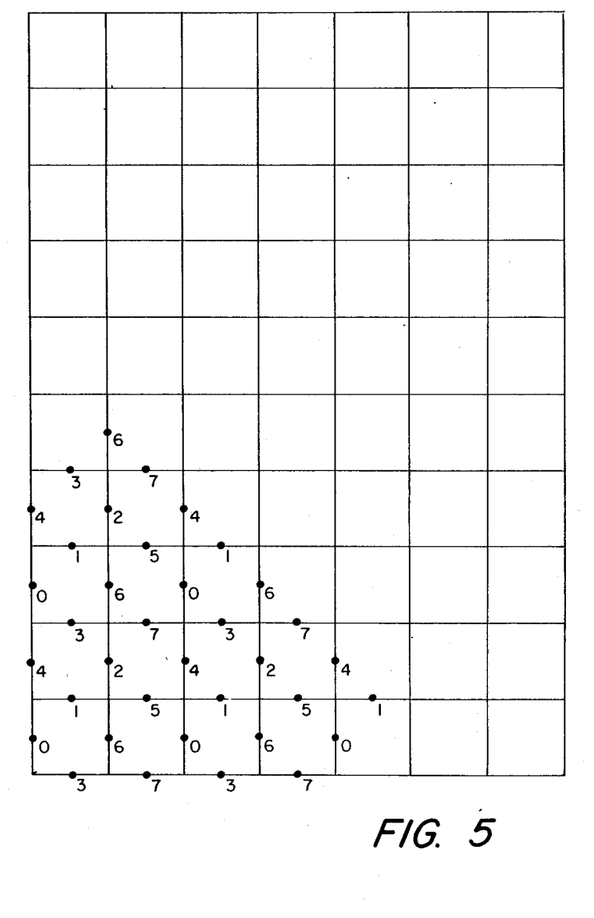
FIG. 5 illustrates one quadrant of the signal constellation of FIG. 4 wherein the Trellis subsets have been identified.

Thus, each point of the signal constellation satisfies four distance relationships relative to its neighboring points, as defined by Equations 1, 2, 3 and 4 above. These distances contain a base distance which is here defined as $d=\sqrt{2}$ and three additional distances, $\sqrt{2d}$, 2d, and $2\sqrt{2d}$. The effect of these distance requirements is that all of the points within a particular set "i" are at least a distance $2\sqrt{2d}$ apart; all points in the pairs of sets defined by Equation 3 are at least 2d from any other point in the set pair; all points in the quartet of sets defined in Equation 2 are at least a distance "2d" from any other point in the quartet of sets defined by Equation 2; and every point has as its nearest neighbor, a point no closer than a distance "d" away. Quadrant I of FIG. 4 is reproduced as FIG. 5 with the points labeled by the set number, i, to which they belong.

The probability of error which can arise in a data transmission system operating with the signal structure of FIG. 2 or FIG. 4 varies depending upon whether additive noise only is considered, or whether both additive and multiplicative noise are considered. This is apparent from a comparison of Equations (5) and (6) below which are valid with regard to the FIG. 2 signal constellation using uncoded modulation. The probability of error for each signal point in the FIG. 2 signal structure is inversely proportional to the exponential of the signal-to-noise ratio at that point. Where the signal-to-noise ratio for any particular point (j) due to additive noise alone (SANR) is expressed in Equation (5), Equation (6) presents the signal-to-noise ratio (SNR) for the point (j) due to both additive and multiplicative noise.

$$SANR_j = d_j^2/A \quad \text{(Equation 5)}$$

$$SNR_j = \frac{d_j^2}{A + 4B|s_j|^2/\sum_{k=1}^{4}|s_k|^2} \quad \text{(Equation 6)}$$

where
- $d_j$ is the distance of a point from the decision line,
- $|s_j|$ is the distance from a point in the signal structure to the origin, where the subscript (j) identifies the point and has the value (in FIG. 2) of 1, 2, 3 or 4,
- A is the variance of the additive noise, and
- B is the variance of the multiplicative noise.

Equation 6 indicates that the signal-to-noise ratio decreases, and correspondingly the probability of error increases, at points located at greater distances from the origin. Further, this increase in the probability of error grows with increasing multiplicative noise.

For a Trellis coded signal, the decoding method uses the Viterbi decoder, which is a maximum likelihood detector for, inter alia, decoding Trellis code modulated signals in the presence of additive noise. The Viterbi algorithm is a computationally efficient method for determining a transmitted sequence by finding the minimum sum-of-square distances for the received sequence, from among all possible transmitted sequences. The details of the Viterbi algorithm are well known in the literature and can be understood, for example, from Proakis, *Digital Communications,* McGraw-Hill, 1983, which is incorporated herein by reference.

With respect to multiplicative noise, neither the CCITT recommended Trellis coding nor the Viterbi decoder, both of which are efficient in additive noise, address the problems which occur when multiplicative noise is present. Thus, it is important to consider that even with the Viterbi decoder, the effect of multiplicative noise becomes critical as the distance of the point in the signal constellation increases from the origin. Thus, while additive noise is well accounted for by use of Trellis coding with a Viterbi decoder, the effect of multiplicative noise, such as that found in signals which pass through the companders used in long distance telephone communications, can be disastrous to points far from the origin of the signal constellation. However, the equations corresponding to Equations 5 and 6 above, for defining the signal-to-noise ratio of a Trellis coded signal are much more complex than those for uncoded transmission.

This invention provides signal structures that take account of multiplicative noise in connection with Trellis coding and Viterbi decoding. The signal structures maximize the signal-to-noise ratio, and hence minimize the probability of error, in the presence of multiplicative noise as well as other impairments such as additive noise.

To this end, the present invention provides a data transmission modem that operates with a signal structure in which the signal-to-noise ratio is essentially constant for all points in the signal constellation, and has an overall minimal level, within the practical constraints of the implementing hardware.

Figure 6:
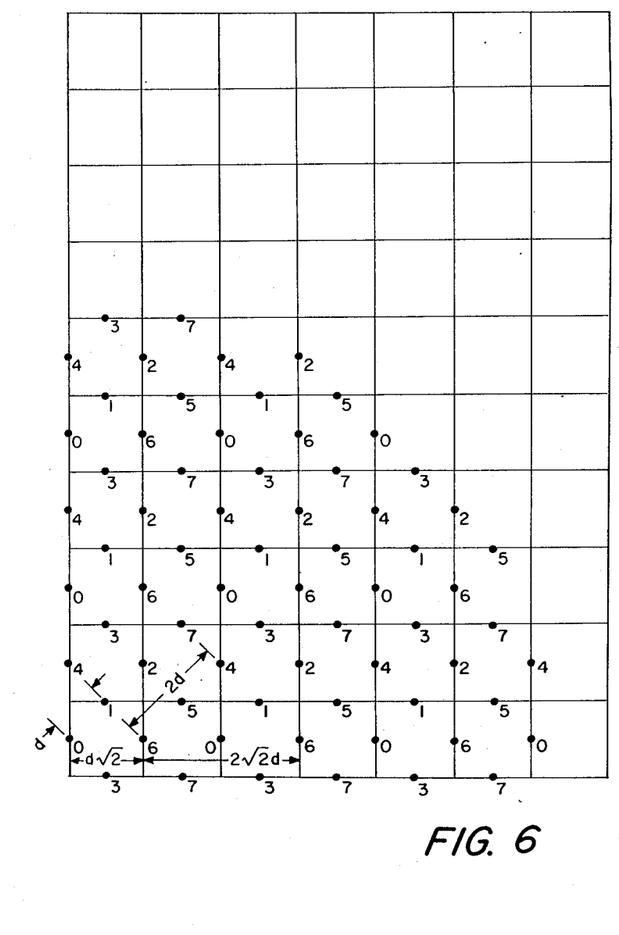
FIG. 6 illustrates one quadrant of a 256 point signal constellation used for 16,800 bps modems wherein the Trellis subsets have been identified.

Referring to FIG. 6, which represents one of the four identical quadrants of a 256 point signal constellation, the signal points have been labeled in accordance with the last three binary digits ($Q_2$, $Q_1$, $Q_0$) of the eight-bit block ($Q_7$, $Q_6$, $Q_5$, $Q_4$, $Q_3$, $Q_2$, $Q_1$, $Q_0$) with which the points are associated. The labeled points satisfy the distance requirements for Trellis coding set forth in Equations 1-4 hereinabove. In accordance with the invention, the signal points of the signal constellation of FIG. 6 are divided into two subsets. Those within a minimum distance, "r", from the origin, are not eligible for movement and remain fixed in relative position. The points outside the circle of minimum radius "r" are eligible for movement in accordance with the following criteria. Unlike the definition of the base distance "d", as defined above in connection with Equations 1-4, wherein "d" is constant, in accordance with the invention, the value of "d" is considered to be a variable parameter which can vary for the points in the second subset of the constellation. The base distance is allowed to increase for points farther from the origin in accordance with Equation 7:

$$d = (AkE + Bk|Si|^2)^{1/2} \quad \text{(Equation 7)}$$

in which:

$$k = 2/(AE + Br^2), \text{ and} \quad \text{(Equation 8)}$$

where A is the variance of the additive noise, B is the variance of the multiplicative noise, $|Si|$ is the distance of the point i from the origin; E is the average energy content of the signal; and r is the minimum distance from the origin for a point to be eligible for movement.

This procedure provides a substantially equal probability of error for all points outside the circle of radius r for a given variance of additive and multiplicative noise. The value of d, defined by Equation 7, is sensitive to the difference, in dB, of A and B but it does not depend upon the absolute value of either one. For example, referring to FIG. 7, the plot of d versus |Si| for r=7, a zero dB difference between additive and multiplicative noise at a data rate of 16.8 kb/s, and an average energy of about 82, provides the base distance d for each particular value of |Si|.

Figure 7:
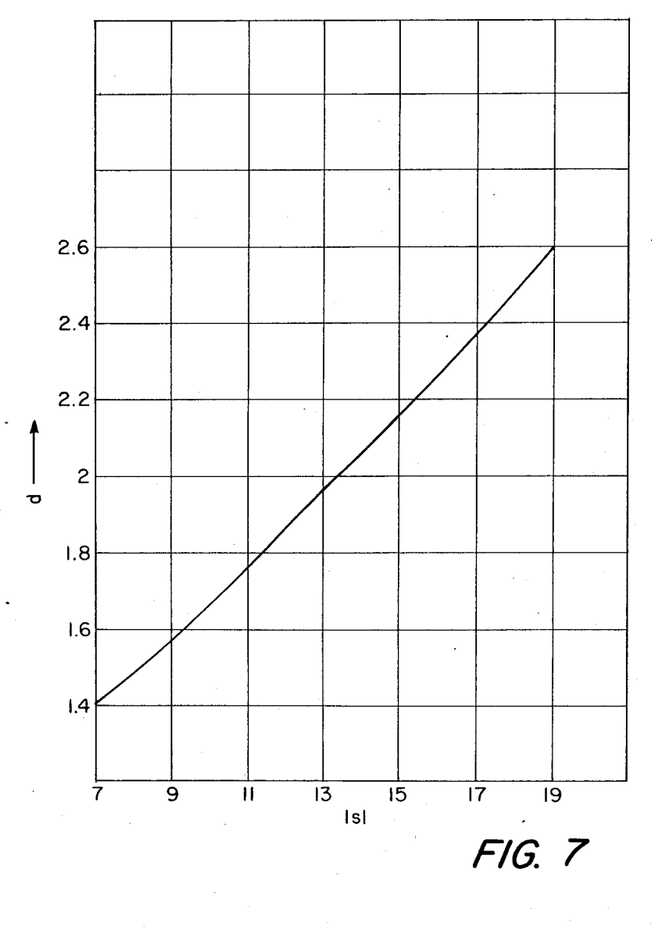
FIG. 7 is a graph showing changes in Trellis code base distance for different values of distance from the origin for 16,800 bps modems.

FIG. 7 can be employed to produce an expanded signal constellation as follows. For each point outside the minimum distance r, starting with the points closest to the origin and working outwardly, the expanded signal constellation can be derived by plotting a new location for each point to be moved such that the base distance "d", determined at the new location satisfies Equations 7 and 8 above (as represented in FIG. 7). Each point thus moves outward from the origin, and each point, at its new location, satisfies Equations 1-4 with a "locally" determined "d" as defined by Equations 7 and 8 (and plotted, for example, in FIG. 7). The resulting expanded constellation, using the example above with the signal constellation of FIG. 6, is illustrated in FIG. 8.

Figure 8:
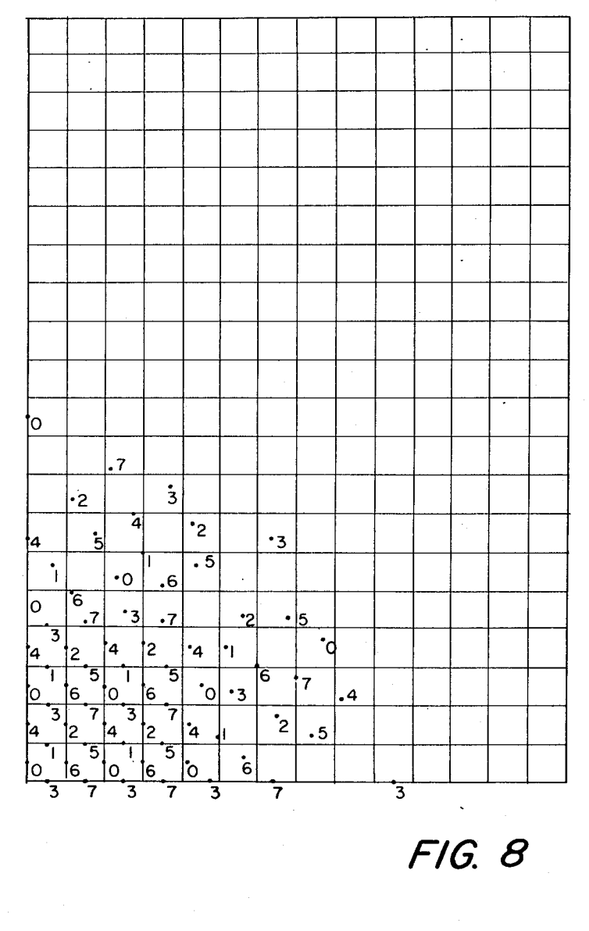
FIG. 8 shows one quadrant of the 256 point signal structure of FIG. 6 expanded according to the invention.
Figure 9:
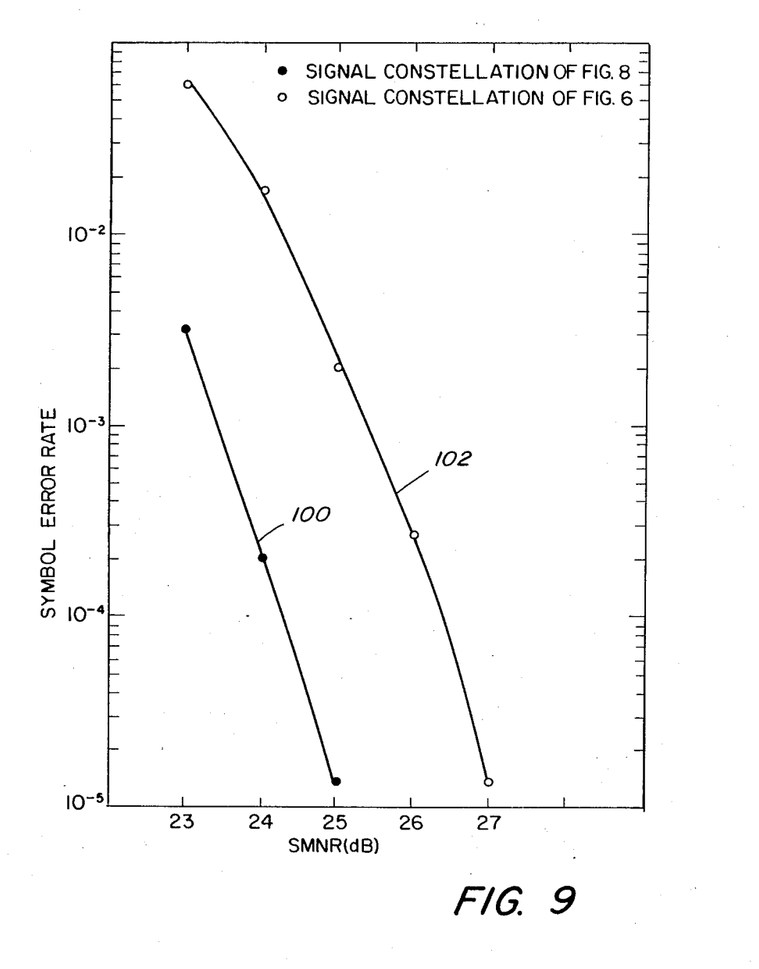
FIG. 9 is a graphical presentation of the difference in error rate for a selected range of signal-to-multiplicative noise ratio for the signal structures of FIGS. 6 and 8.

In accordance with a computer simulation, FIG. 9 describes the difference in symbol error rate for values of signal-to-multiplicative noise ratio over a range 23–27 dB's. Thus, curve 100 represents the relationship for the signal constellation of FIG. 6 while curve 102 represents the relationship for the signal constellation of FIG. 8. In accordance with the invention, there is an almost two orders of magnitude symbol error rate improvement for the expanded signal constellation of FIG. 8 when compared to the signal constellation of FIG. 6.

Figure 10:
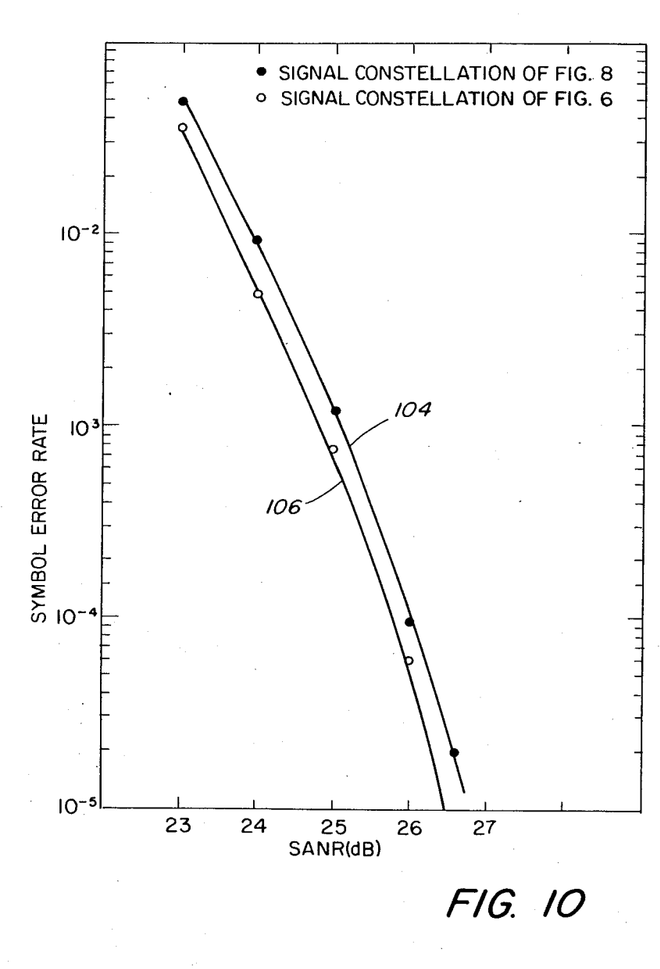
FIG. 10 is a graphical presentation of the difference in error rate for a selected range of signal-to-additive noise ratio for the signal structures of FIGS. 6 and 8.

Referring now to FIG. 10, there is similarly, relating to curve 104 for FIG. 6 and curve 106 for FIG. 8, a small loss in the symbol error rate due to additive noise. This loss results, for a constant energy transmission system, from the closer packing of the points nearer the origin in FIG. 8 relative to that shown in FIG. 6. There thus results a slightly greater impairment due to additive noise but, referring to FIG. 9, a significantly improved system in response to multiplicative noise.

As noted above, the Viterbi decoder is a maximum likelihood detector for, inter alia, Trellis code modulated signals in the presence of additive noise. The Viterbi decoder however can be modified in accordance with the preferred embodiment of the invention to render it a maximum likelihood receiver for signals having both multiplicative noise and additive noise. In the modified version of the Viterbi decoder, the distance measurement, for each received symbol is redefined as:

$$d'^2 = d^2 / \left( A + \frac{B|Si|^2}{E} \right) \quad \text{(Equation 9)}$$

Thus, rather than using "d²38 as the distance measurement, the maximum likelihood receiver uses "d'²". If there is no multiplicative noise, B=0, the distances are scaled by 1/A. The result for the minimum distance sequence remains exactly the same therefore, as for the sequence detected in accordance with the unmodified detector. Therefore, the modification does not change the performance of the Viterbi method in the presence of solely additive noise. Nevertheless, however, the results reveal a significant performance improvement in the presence of multiplicative noise using the distance definition of Equation 9. It will be apparent therefore, to those familiar with the Viterbi decoder, how to adjust the decoder to take account of multiplicative noise. In addition, this modification can be employed in the Viterbi decoder for other convolutional coding methods which employ the Viterbi decoding method. An improvement is signal-to-noise ratio on the order of 1 dB can be expected in the presence of multiplicative noise.

The modem 10, as illustrated in FIG. 1, can be constructed with known electronic skills to operate with signal structures according to the invention. In particular, the modem mapping encoder 16 can be constructed to encode binary symbols to signal points according to a signal structure as described and as embodied, for example, in FIG. 8. Correspondingly, the modem decoder 38 can provide the reverse operation. The following articles are incorporated herein by reference, and are exemplary of teaching in the art of modem constructions as represented in FIG. 1 and of their implementation:

P. J Van Gerwen et al., "Microprocessor Implementation of High-Speed Data Modems," *IEEE Transactions On Communications,* Vol. COM-25, No. 2, February 1977, pp. 238–250.

M. Koya et al., "High Speed Data Modem Using Digital Signal Processor," *IEEE,* International Communication Conference, 1981, pp. 14.7.1–14.7.6.

In addition Trellis code modulation is described in, for example, the following articles which are incorporated herein by reference:

G. Ungerboeuk, "Channel Coding With Multilevel/Phase Signals," *IEEE Trans. on Information Theory,* pp 55–67, January 1982.

"Draft Recommendation for 14,400 BPS", USA, Temporary Doc. No. D177, October 1983.

Additions, subtractions, deletions, and other modifications of the disclosed preferred embodiment of the invention will be apparent to those practiced in the art and are within the scope of the following claims.

What is claimed is:

1. A method for determining a quadrature-amplitude modulated data transmission signal structure for Trellis coding and having a two-coordinate complex plane representation that has a plurality of points, said method having the improvement comprising the steps of A. arranging a first subset of a plurality of said points in a substantially regular Trellis-coded pattern centered at the origin of said complex plane representation, with substantially uniform low probability of error for at least additive noise, and B. arranging a second subset of a plurality of said points, consisting of the remainder of the points, in said complex plane representation outward from said first subset at locations further spaced apart than corresponding locations of said regular Trellis-coded pattern and with points thereof closest to the coordinate axes being further removed from such axes than corresponding locations in said regular Trellis-coded pattern, and with points thereof equidistant from the coordinate axes being further removed from the origin than corresponding locations in said regular Trellis-coded pattern, and further arranging said points of said second subset with substantially uniform low probability of error for multiplicative noise.

2. A method as defined in claim 1 in which said improvement includes locating each point in said second subset thereof at a base distance, (d), relative to neighboring points in said complex plane representation, according to the expression $$d=(AkE+Bk|Si|^2)^{\frac{1}{2}}$$

where

A is the variance of a selected level of additive noise,
B is the variance of a selected level of multiplicative noise,
|Si| is the distance of the point (i) from the origin,
k equals $2/(AE+Br^2)$, where (E) is the average energy in the two subsets of points, and (r) is the distance from the origin to the furthest point in the first subset.

3. A method for communicating on voice-grade telephone lines each of blocks of M binary data digits, each said block of M binary digits being Trellis coded into M+1 binary digits, each set of M+1 binary digits being encoded into one of $2^{M+1}$ values of a double side band-quadrature carrier modulated signal in accordance with mapping rules for a Trellis encoded signal, where M is a positive integer, said method having the improvement comprising the steps of A. selecting said $2^{M+1}$ Trellis-coded signal values with minimal overall probability of said transmission error, and B. producing each said signal to have substantially equal probability of transmission error due to a selected non-zero and finite level of multiplicative noise and a selected non-zero and finite level of additive noise.

4. A method according to claim 3 wherein said improvement includes the steps of

A. decoding a received data transmission of said Trellis-coded signals using a Viterbi decoding procedure, and B. providing the base distance (d') for each point in a two-coordinate graphical representation and corresponding to a signal value produced with said decoding procedure according to the equation $$d'=d/[A+(B|Si|^2/E)]^{\frac{1}{2}}$$

where d is the base distance for conventional Trellis-coded signals,
A is the variance of additive noise,
B is the variance of multiplicative noise,
|Si| is the distance of the signal point (i) from the origin of the complex plane representation, and
E is the average energy content of the signal.

5. Modem apparatus for data transmission and having, at a transmitting station, a Trellis encoder, and at a receiving station, a Viterbi decoder, said apparatus having the improvement wherein A. said encoder comprises
 (i) means for converting each input block of M binary data digits, each said block of M binary digits being Trellis coded into M+1 binary digits, into one of the $2^{M+1}$ values of a Trellis-encoded quadrature amplitude-modulated signal, where M is a positive integer,
 (ii) means for providing each said signal to have substantially equal probability of transmission error due to a selected non-zero and finite level of multiplicative noise and a selected non-zero and finite level of additive noise, and
 (iii) means for providing a structure of said $2^{M+1}$ Trellis-encoded signals with minimal overall probability of said transmission error, and B. said Viterbi decoder includes means for converting serially received ones of the received values of a received quadrature amplitude-modulated signal, where said signals are provided with said encoding, to a set of M binary digits.

6. Modem apparatus according to claim 5 wherein said improvement further includes means in said Viterbi decoder for modifying the base distance (d') determination of the signal point, in a two-dimensional graphical representation corresponding to a received signal, according to the equation $$d'=d/[A+(B|Si|^2/E)]^{1/8}$$

where d is the base distance for conventional regular Trellis-coded signals,
A is the variance of additive noise,
B is the variance of multiplicative noise,
|Si| is the signal point (i) from the origin of said complex plane representation, and
E is the average energy content of the signal.

* * * * *

UNITED STATES PATENT AND TRADEMARK OFFICE
CERTIFICATE OF CORRECTION

PATENT NO. : 4,660,214
DATED : April 21, 1987
INVENTOR(S) : Kaveh Pahlavan and Jerry L. Holsinger It is certified that error appears in the above-identified patent and that said Letters Patent is hereby corrected as shown below:

In title, delete "QUANI", and insert --QAM--.

At Column 9, line 62, delete "$d^2 38$ as the ", and insert --$d^2$ as the--.

At Column 12, line 40, delete "$d'=d/[A+(B/Si/^2/E)]^{178}$", and insert -- $d'=d/[A+(B/Si/^2/E)]^{1/2}$ --.

Signed and Sealed this

Twenty-fourth Day of January, 1989

Attest:

DONALD J. QUIGG

*Attesting Officer*     *Commissioner of Patents and Trademarks*